(12) United States Patent
Volpe et al.

(10) Patent No.: US 10,956,248 B1
(45) Date of Patent: Mar. 23, 2021

(54) CONFIGURABLE REPORTING FOR DEVICE CONDITIONS

(71) Applicant: Amazon Technologies, Inc., Seattle, WA (US)

(72) Inventors: Thomas A. Volpe, Austin, TX (US); Raymond S. Whiteside, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 16/200,602

(22) Filed: Nov. 26, 2018

(51) Int. Cl.
*G06F 11/07* (2006.01)

(52) U.S. Cl.
CPC ...... *G06F 11/0772* (2013.01); *G06F 11/0721* (2013.01); *G06F 11/0724* (2013.01)

(58) Field of Classification Search
CPC ....... G06F 9/48; G06F 9/4812; G06F 11/0772
USPC ......................... 714/10–13, 30, 31
See application file for complete search history.

(56) References Cited

U.S. PATENT DOCUMENTS

| | | | |
|---|---|---|---|
| 7,379,860 B1 | 5/2008 | Bartz et al. | |
| 7,681,078 B2 * | 3/2010 | Moyer | G06F 11/3656 714/23 |
| 7,865,771 B2 * | 1/2011 | Yang | G06F 11/0724 714/17 |
| 8,095,917 B2 | 1/2012 | Stall | |
| 9,104,599 B2 | 8/2015 | Atkisson et al. | |
| 2008/0010621 A1 * | 1/2008 | Williams | H01L 27/1288 716/136 |
| 2009/0049312 A1 | 2/2009 | Min | |
| 2010/0332909 A1 | 12/2010 | Larson | |
| 2012/0124047 A1 | 5/2012 | Hubbard | |
| 2013/0346594 A1 | 12/2013 | Banerjee et al. | |
| 2014/0305525 A1 | 10/2014 | Le Moing et al. | |
| 2015/0100767 A1 | 4/2015 | Topham | |
| 2015/0100842 A1 | 4/2015 | Rao et al. | |
| 2016/0142940 A1 | 5/2016 | Teo et al. | |
| 2017/0083434 A1 | 3/2017 | Potash | |
| 2017/0083464 A1 | 3/2017 | Potash | |
| 2018/0365017 A1 * | 12/2018 | Shirvani | G06F 11/0793 |

OTHER PUBLICATIONS

"Embedded Trace Buffer", Texas Instruments Wiki, Available online at: https://processors.wiki.ti.com/index.php/Embedded_Trace_Buffer, 2020, 10 pages.

(Continued)

*Primary Examiner* — Joseph R Kudirka
(74) *Attorney, Agent, or Firm* — Kilpatrick Townsend & Stockton LLP

(57) ABSTRACT

An integrated circuit configured to execute program instructions can generate, based on a configuration, any combination of a notification message, a halt signal, or an interrupt signal for a condition detected in the integrated circuit. The detected condition can be an error condition or a non-error condition. The notification message for the condition may be written to memory accessible by a host processor. The non-error condition may be used by the host processor to monitor internal states of the integrated circuit. The halt signal may be used to stop the integrated circuit from executing the instructions.

20 Claims, 8 Drawing Sheets

(56) References Cited

OTHER PUBLICATIONS

U.S. Appl. No. 16/216,873, filed Dec. 11, 2018 Titled "Execution Synchronization and Tracking".
U.S. Appl. No. 16/200,620, filed Nov. 26, 2018 Titled "Operational Management of a Device".
U.S. Appl. No. 16/216,855, filed Dec. 11, 2018 Titled "Event-Based Device Performance Monitoring".
U.S. Appl. No. 16/146,834, filed Sep. 28, 2018 Titled "Reconfigurable Instruction".
U.S. Appl. No. 16/145,050, U.S. Patent Application, filed Sep. 27, 2018, Titled: Notifications in Integrated Circuits.
U.S. Appl. No. 16/145,050, "U.S. Patent Application No.", Notifications in Integrated Circuits, filed Sep. 27, 2018.

\* cited by examiner

CONFIGURABLE REPORTING FOR DEVICE CONDITIONS

BACKGROUND

A processing device executing instructions can encounter different types of error conditions during runtime. For example, the error conditions may be caused due to incorrect behavior of the device hardware or by the code being executed by the device. In most instances, an interrupt may be generated to notify the detection of an error so that the error can be corrected or logged.

BRIEF DESCRIPTION OF THE DRAWINGS

Various embodiments in accordance with the present disclosure will be described with reference to the drawings, in which.

DETAILED DESCRIPTION

Figure 1:
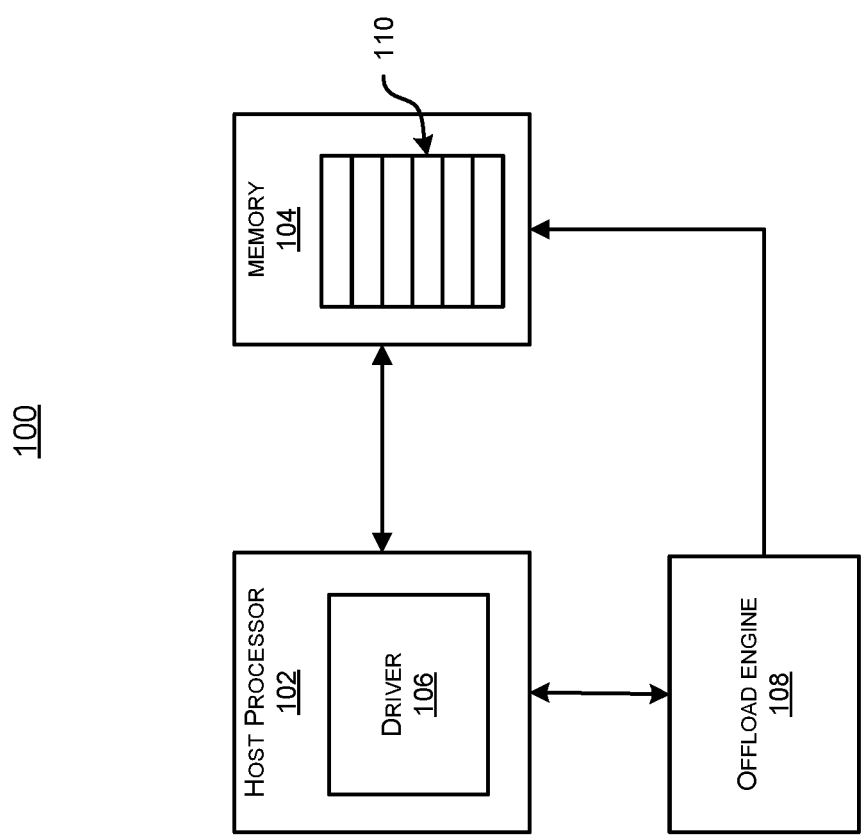
FIG. 1 includes a block diagram that illustrates an example of a computing system.

Various error conditions may occur during operation of an integrated circuit device. The integrated circuit device may include an offload engine which may be configured to offload certain operations from a host processor in a computing system so that the host processor can be free to perform other operations. The offload engine may be an accelerator or a type of processor, such as a floating point processor, a graphics processor, a neural network processor, a special-purpose processor, or any other type of integrated circuit device that can execute program code. The error conditions may be caused due to incorrect behavior of the device hardware or by the code being executed by the device. For example, the error conditions may correspond to different error types such as software programming errors (e.g., unknown or incorrect instruction errors, branch errors), hardware errors (e.g., error correction code (ECC) errors), runtime performance errors (e.g. buffer overflow errors, queue full errors), system errors (e.g., time out errors), etc.

Generally, an interrupt signal may be generated by the device upon detection of an error. The interrupt signal may be sent to the host processor for processing. In many cases, the interrupt signal itself can provide information about a state of the device, and/or software executing on the host processor can read a register that stores information that may describe what caused the device to generate the interrupt signal. Handling an interrupt can have a significant impact on the operation of the host processor. For example, the host processor may have to halt most or all other operations in order to service the interrupt which may impact the performance of the computing system. Even if the cause of the error can be identified using the interrupt signal, in most cases, the instruction being executed when the error occurred cannot be identified using the interrupt signal. Thus, it may be desirable to have an error reporting mechanism that has minimum impact on the performance and can provide additional relevant information related to the error conditions.

Embodiments of the disclosed technologies can provide configurable reporting mechanisms which can provide additional information about certain conditions encountered by the integrated circuit device. These conditions may include error conditions or non-error conditions which can be resolved, ignored or monitored for various purposes. The conditions may or may not be pre-determined. For example, certain conditions could lead to an error, could be error conditions, or could occur as a result of the error. According to certain embodiments, an offload engine in a computing system can be configured to provide one or more reporting options for a condition encountered by the offload engine, or ignore the condition. For example, the offload engine can be configured to generate any combination of a notification message, a halt signal, or an interrupt signal for the detected conditions. The offload engine can be programmed by a driver executing on the host processor to enable generation of the notification message, the halt signal, the interrupt signal, or any combination thereof for each condition based on a configuration. In certain embodiments, the configuration may depend on the error type. For example, a first configuration may correspond to a first error type for a first group of errors, a second configuration may correspond to a second error type for a second group of errors, and a third configuration may correspond to a third error type for a third group of errors, and so on.

A notification message, as described herein, can enable the offload engine to output information about the internal states of the device, without having to conduct time consuming input/output (I/O) operations, thereby reducing the impact on system performance. The notification message may include a timestamp indicating a point in time the condition occurred and a condition identifier for the condition. The notification message can be written to a memory which may be accessible by the host processor. The memory may belong to the offload engine or to the host processor. For example, the memory may be a dynamic random access memory (DRAM), a static random access memory (SRAM), or another suitable memory. The offload engine can use a single time source for adding timestamps to the notification messages, so that the notification messages can be used to reconstruct a timeline of the operation of the device.

In some instances, the notification message can provide to the host processor information related to a certain condition detected in the offload engine in a non-intrusive manner, which may be used by the host processor to reconfigure certain functionality or monitor certain operations occurring in the offload engine. For example, a correctable ECC error may be considered a non-error condition that may be used by the host processor to keep track of the number of correctable ECC errors that have occurred for a certain operation, which can provide an indication when the memory is starting to fail. The timestamp in the notification message can enable visibility into the operation of the device, debugging information about both the hardware and the execution of software code, and the ability to measure the performance of the device, as well as other uses. For example, the timestamp can be used by the host processor to correlate with an instruction that the offload engine may have been executing at that point in time when the condition occurred. The host processor can take subsequent actions (e.g., reconfigure certain parameters or functions) to avoid the condition in the future as required.

The halt signal may be generated upon detection of a condition as configured by the driver. In some implementations, the halt signal may be asserted by setting a bit in an execution control register, and can be de-asserted by setting another bit in the execution control register. In other implementations, a single bit may be used to assert or de-assert the halt signal. The halt signal may be used to stop the offload engine from executing the instructions while the halt signal is asserted. For example, in some instances, the offload engine may generate the halt signal upon encountering an unknown or wrong instruction error. The halt signal may be de-asserted once the error is logged or cleared and the offload engine can resume execution of the instructions. In some embodiments, the offload engine may be configured to generate an interrupt signal along with the halt signal so that the host processor can read the memory states of the offload engine while it is halted. The host processor can then identify a cause of the condition so that the offload engine can resume normal operation. Thus, some embodiments can be used to configure the offload engine to allow different reporting options for various conditions, which can provide flexibility and improve system performance. Certain embodiments can be used to configure different integrated circuit devices executing respective program code in a computing system with their respective reporting mechanisms. In some examples, a first integrated circuit device may be configured by a first processor with a first reporting option, and another integrated circuit device may be configured by a second processor in a computing system with a second reporting option.

In the following description, various examples will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 includes a block diagram that illustrates an example of a computing system 100. The computing system 100 may comprise an offload engine 108 coupled to a host processor 102 and a memory 104. The host processor 102 may be configured to execute software code to configure and manage the offload engine 108. The software code may belong to user space, or may have higher privileges than the offload engine 108. The computing system 100 can include other components that are not illustrated here.

The host processor 102 of this example can be a general purpose processor for executing program instructions. The host processor 102 can also be referred to as the computing system's primary processor, and/or as a Central Processing Unit (CPU). The host processor 102 can be implemented using an integrated circuit. In some examples, the host processor 102 can include multiple processing cores. In some examples, the computing system 100 can include more than one host processor, possibly working in a coordinated manner.

The host processor 102 may be responsible for the overall management and control of the example computing system 100, including executing the computing system's operating system. Operations that the host processor 102 may be responsible for include, for example, executing programs such as device drivers that manage other hardware components in the computing system 100, and processing or responding to input from users or other computing systems, among other examples. In the illustrated example, the host processor 102 may execute a driver 106 to manage operations of the offload engine 108. In some embodiments, the host processor 102 may pre-determine the conditions that may be generated in the offload engine 108 during runtime and configure the offload engine 108 to mask or unmask each condition based on the type of condition. For example, certain conditions could lead to an error, could be error conditions, or could occur as a result of the error. The host processor 102 may also configure the offload engine 108 to report the detected condition by generating one or more of a notification message, an interrupt signal, or a halt signal based on the type of the condition. The host processor 102 may ignore, monitor, or resolve the condition based on the type of the condition.

The memory 104 may belong to the offload engine 108 or the host processor 102. The memory 104 may be a Dynamic Random Access Memory (DRAM), though other volatile memory technologies can be used, including, for example, Static RAM (SRAM), Synchronous Dynamic RAM (SDRAM), and Double Data Rate Synchronous Dynamic RAM (DDR), among others. In various examples, non-volatile memory types, such as Flash-based memory, can be used for the memory 104.

The offload engine 108 may be, for example, an accelerator or a type of processor, such as a floating point processor, a graphics processor, a neural network processor, a special-purpose processor, or any other type of integrated circuit device that can execute program code. In some examples, the offload engine 108 can be a special-purpose processor that can execute instructions for orchestrating the movement of data within the computing system 100. The instructions may be stored in an instruction memory. In other examples, the offload engine 108 may be designed to perform certain functions, such as floating point calculations or graphics rendering, more efficiently than when these operations are performed by the host processor 102. The offload engine 108 can thus offload these operations from the host processor 102, so that the host processor 102 can be free to perform other operations.

In various embodiments, the offload engine 108 may be configured to detect a condition and generate one or more of a notification message, a halt signal, or an interrupt signal upon detecting the condition based on a configuration. The condition may be an error condition generated within the offload engine 108 during runtime, or a non-error condition that may provide information related to the internal status of the offload engine 108. For example, the error conditions may be associated with invalid accesses to the instruction memory (e.g., unknown instructions, illegal value in instruction fields, instruction memory misaligned writes, instruction memory illegal length writes, misaligned write addresses, etc.), queues (e.g., queue full, queue disabled), or other relevant errors. For fatal errors, the offload engine 108 may be configured to halt, cause an interrupt or send a notification message to the host processor 102 so that the host processor 102 can resolve the erroneous condition and the offload engine 108 can resume the normal operation.

In some instances, the detected condition may be non-fatal and can be used to provide information related to the internal status of the offload engine 108 which can be used by the host processor 102 to analyze performance, debug, or reconfigure certain features of the offload engine 108. For example, a forward branch error or a backward branch error may inform the host processor 102 of the operational flow of the offload engine 108. In another example, a correctable ECC error or a non-correctable ECC error may be used by the host processor 102 to monitor the health of the memory. For example, the host processor 102 can track occurrences of the ECC conditions over a period of time to determine that a certain portion or all of the memory is starting to fail so that the memory can be reconfigured or replaced.

The halt signal generated by the offload engine 108 upon detecting a condition may be used to stop the offload engine 108 from executing instructions. For example, in some instances, the offload engine 108 may encounter an invalid instruction which the offload engine 108 may be unable to decode. In such instances, it may be desirable to halt the offload engine 108 so that the instruction can be corrected or skipped, and the offload engine 108 can resume normal operation. In the halted state, registers in the offload engine 108 may still be written or read by the host processor 102. In some embodiments, an interrupt signal may be generated with the halt signal to notify the host processor 102 of the condition and/or that the offload engine 108 is halted. The host processor 102 may resolve the condition upon receiving the interrupt signal.

The offload engine 108 may be configured to write the notification message to a memory accessible by the host processor 102 to notify the host processor 102 of the condition. In some examples, the offload engine 108 can, alternatively or additionally, write notifications to other memories in the computing system 100, such as the memory of a transmitter that can send the notifications, over a network, to another computing system. The notification message may include a timestamp indicating a point in time the condition occurred and a condition identifier for the condition. The condition identifier may indicate a type of the condition. For example, the condition identifier may indicate a type of an error condition or a non-error condition. In some embodiments, the conditions may be classified into different types. As an example, a first error type may correspond to a first group of errors associated with runtime performance errors, a second error type may correspond to a second group of errors associated with hardware errors, and a third error type may correspond to a third group of errors associated with programming errors. Note that the conditions may be classified into various groups based on non-error conditions, error conditions, hardware related error conditions, runtime performance related error conditions, software related error conditions, programming related error conditions, system related error conditions, or other suitable criteria without deviating from the scope of the disclosed technologies. The offload engine 108 may use a single time source for adding timestamps to the notification messages, so that the notification messages can be used to reconstruct a timeline of the operation of the offload engine 108. The timeline may be used to detect the cause of the condition since the host processor 102 can correlate the timing of the condition as indicated by the timestamp with the instruction being executed by the offload engine 108 at that point in time. Additionally, the notification message may not need immediate attention of the host processor 102, unlike an interrupt, and can be handled whenever the host processor 102 has time to read the notification message.

In some embodiments, the offload engine 108 may be configured to write the notification message to a queue 110 in the memory 104. In various examples, the driver 106 can configure the queue 110, in addition to performing other operations. Configuring the queue 110 can include, for example, determining a size for the queue 110 and requesting an allocation of memory for the queue 110. The operating system can, for example, allocate, for the queue 110, a portion of the memory allocated to the driver 106, or can allocate additional space in the memory 104. From the allocated memory, the driver 106 can determine a base address for the queue 110. The driver 106 can further provide the base address and size, and other information about the queue 110, to the offload engine 108, so that the offload engine 108 has the information to be able to write to the queue 110. The notification message may also include a bit or a set of bits, which can be referred to herein as the phase or phase value, to inform the driver 106 that the offload engine 108 has added a notification message to the queue 110. In some embodiments, different queues can be designated for storing different condition types.

In various examples, an operation of the driver 106 can include reading notification messages from the queue 110, and determining what, if anything, should be done with the information provided in a notification message. For example, the driver 106 can sort the notification messages by the timestamps included in the notification messages, and can take an appropriate action. For example, based on the condition identifier in the notification message, the driver 106 can respond to those notification messages by stopping or resetting the offload engine 108. In other examples, the driver 106 can otherwise change the operation of the offload engine 108 as a result of a notification message. Other operations of the driver 106 can include, for example, loading program code into the offload engine 108 and causing the offload engine 108 to begin executing the program code, among other examples.

Thus, certain embodiments of the disclosed technologies can allow configuring the offload engine 108 to report a condition upon detection using one or more of a notification message, a halt signal, or an interrupt signal. The timestamp provided in the notification message can be used by the host processor 102 to correlate with an instruction executing at that point in time which can be beneficial in debugging or analyzing performance of various features supported by the offload engine 108. Additionally causing a halt can avoid further execution of the program code by the offload engine 108 until the condition is resolved by the host processor 102.

Figure 2:
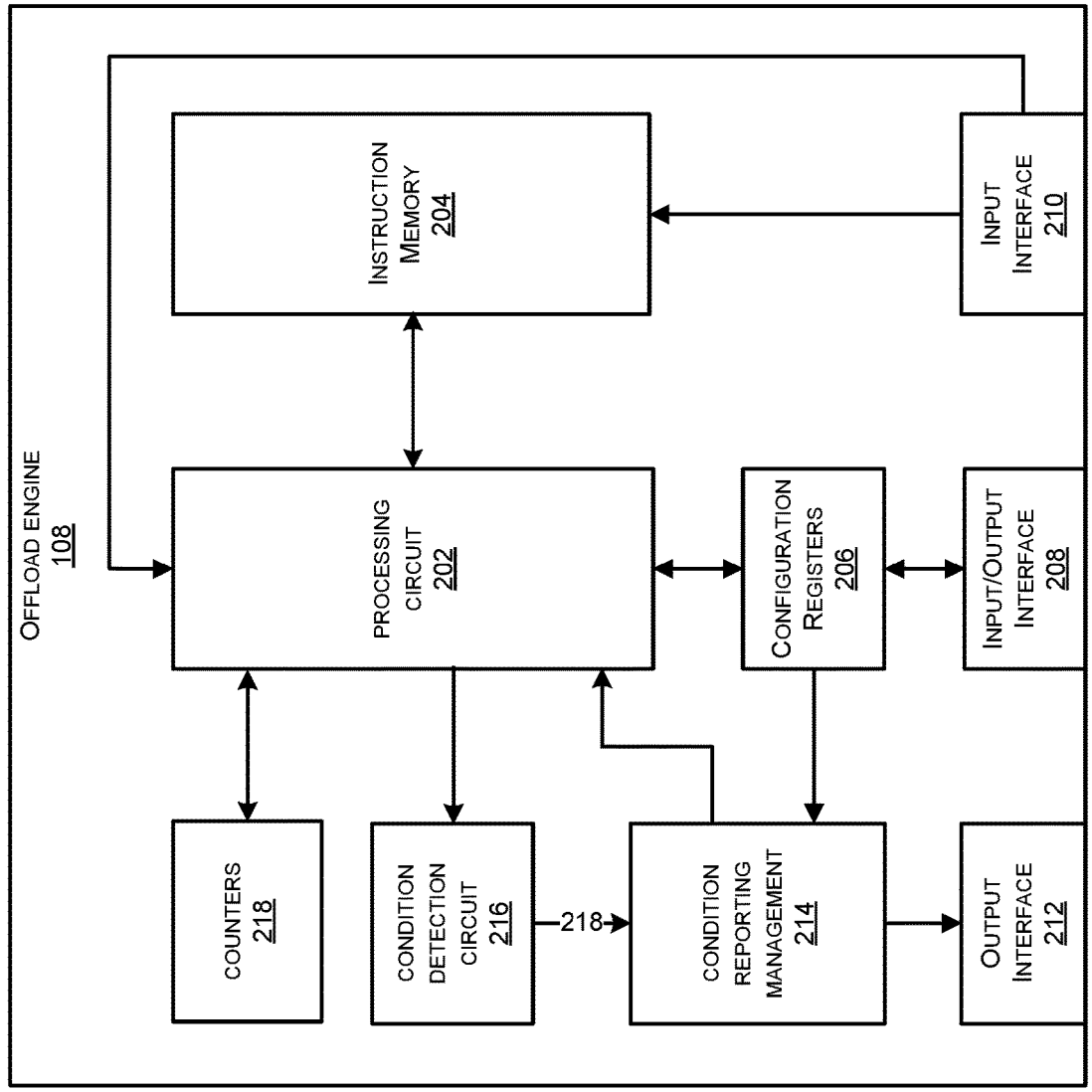
FIG. 2 is a block diagram illustrating an example of an offload engine which provides configurable reporting for various conditions encountered by the offload engine.

FIG. 2 is a block diagram illustrating an example of the offload engine 108 that includes a configurable reporting mechanism for various conditions detected in the offload engine 108. The offload engine 108 is an example of an integrated circuit device that can execute program instructions. The offload engine 108 can be a data movement processor configured to orchestrate movement of data within a computing system comprising other integrated circuits, or an accelerator configured to perform certain operations faster than the host processor 102. In various examples, the offload engine 108 can be implemented using an integrated circuit device, such as an Application Specific Integrated Circuit (ASIC), a Field Programmable Gate Array (FPGA) or a similar integrated circuit device. In some examples, the offload engine 108 can be incorporated into a larger integrated circuit device. For example, the offload engine 108 can be a component in a System on a Chip (SoC).

In the example illustrated in FIG. 2, the offload engine 108 includes a processing circuit 202, an instruction memory 204, configuration registers 206, an input interface 210, an output interface 212, a condition reporting management 214, a condition detection circuit 216, and counters 218. The offload engine 108 further includes a combined input/output interface 208 that can provide an alternative interface for exchanging data with other components in the computing system. Each of the blocks illustrated in the example of FIG. 2 can include a portion of the overall integrated circuitry of the offload engine 108.

In various examples, the input interface 210 may provide the offload engine 108 with the ability to receive data from other components in the computing system 100. The data can include program code and other data. For example, in some embodiments, the driver 106 that controls the operation of the offload engine 108 can cause program code to be written to the offload engine 108, which may be received at the input interface 210. As a further example, the driver 106 can also issue a write transaction to update a pointer for the queue 110, and this write transaction can be received at the input interface 210. The input interface 210 can be implemented, for example, as an Advanced Extensible Interface (AXI) slave interface, for when the computing system's communication fabric includes an AXI bus structure. In various examples, other bus structures and bus protocols can be used.

In various examples, the instruction memory 204 can provide the offload engine 108 with local storage for program code. In some implementations, the instruction memory 204 may be managed by the processing circuit 202. As an example, the instruction memory 204 can be 64 kilobytes (KB) in size, and be logically organized with 32-bit words (e.g., each addressable location stores 32 bits). In some examples, the instruction memory 204 can be protected using Single-Error Correcting and Double-Error Detecting (SECDED) ECC. In some examples, read and write transfers have lengths in multiples of four bytes, and are 4-byte aligned, or else transactions do not complete and an error condition may occur.

The counters 218 may include a timestamp counter, loop counters, a timeout counter, and other relevant counters. The timestamp counter may count clock cycles starting at the hardware reset of the offload engine 108. The timestamp counter value may be included in the notification message generated by the offload engine 108. In various examples, a counter can be a register that can be incremented or decremented by program instructions. Counters can be used by program code that executes on the offload engine 108 for various purposes. For example, the program code can use a counter to count a number of iterations of a loop in the code, or the number of times a certain instruction or set of instructions occurs. In some examples, the offload engine 108 does not modify a counter other than at the direction of instructions in the program code (e.g., instructions for setting a value in the counter, incrementing the counter, or decrementing the counter, among others).

The processing circuit 202 may be configured to fetch an instruction from the instruction memory 204, decode the instruction, and execute the instruction. In some embodiments, the instructions can, for example, initiate movement of data from one location in the computing system to another (e.g., from a memory to another device in the system), wait on a timer, wait on an event, write a notification message to a memory location, or trigger an interrupt, among other operations.

The events may be used to synchronize the activity of the offload engine 108 with the activity of the other components in the computing system. Waiting on an event may involve watching a register associated with the event for a change. The change can be, for example, the setting of a value in the register, or the clearing (e.g., writing to zero) of the register. While waiting for the event to occur, the offload engine 108 may stall and stop executing instructions. Otherwise, when the processing circuit 202 decodes a wait-for-event instruction and finds the event has already occurred (e.g., a particular value is already present in the event register), then the offload engine 108 may proceed to the next instruction.

The configuration registers 206 may include a set of registers (e.g., for information such as a base address, a head pointer, and a tail pointer) for the queue 110 in the memory 104. The configuration registers 206 may also include one or more reporting configuration registers, a current timestamp register, an execution control register, and any other relevant registers. The one or more reporting configuration registers may be programmed by the driver 106 executing on the host processor 102. In one example, the configuration registers 206 may also include a condition mask register may comprising a respective mask bit for each condition to indicate whether the condition is masked or unmasked. In another example, masking of each condition may be controlled by the respective reporting configuration register. The execution control register may be used to halt execution by setting a bit and to exit the halted state by setting another bit. The reporting configuration registers may be used to enable generation of a combination of a notification message, a halt signal, or an interrupt signal for each condition. In various examples, a single reporting configuration register or multiple reporting configuration registers may be used to enable different reporting options for each of the detected conditions. The current timestamp register may be a read-only register which may indicate a current timestamp value based on the timestamp counter value in the counters 218. In various examples, the current timestamp register may be read to reconstruct a timeline relative to a timestamp included in a notification message.

In some embodiments, the output interface 212 may provide the offload engine 108 with an interface through which the offload engine 108 can output data to other components in the computing system 100. The output interface 212 can, for example, connect to a communication fabric in the computing system 100. The output interface 212 can be implemented, for example, as an AXI master interface, for connecting to an AXI bus structure. In various examples, other bus structures and bus protocols can be used.

In various examples, the configuration registers 206 can be read from and written to through a combined input/output interface 208. The combined input/output interface 208 can provide the offload engine 108 with an alternate communication path to other components in the system. This path can be slower than the paths used by the input interface 210 and the output interface 212, or may provide a more direct connection to the host processor 102. In some examples, the combined input/output interface 208 may be optional, and the offload engine 108 may receive transactions for the configuration registers 206 at the input interface 210, and send data from the configuration registers 206 out through the output interface 212.

The condition detection circuit 216 may be configured to detect certain conditions generated in the offload engine 108 during runtime. The condition detection circuit 216 may provide a detected condition 218 to the condition reporting management 214 for reporting the condition using one or more configurable reporting methods. In some examples, the condition may be a condition that has been pre-determined beforehand by the host processor 102. In some instances, the condition may indicate an error condition generated in the offload engine 108. Errors can occur due to a problem in the operation of the hardware of the offload engine 108, due to misconfiguration of the offload engine 108, because of problems in the program code, and/or due to the offload engine 108 receiving problematic instructions from other components in the computing system, among other examples. An error can be detected, for example, when an instruction is encountered by the processing circuit 202 that cannot be decoded or that contains invalid fields, among other examples. Errors can be, alternatively or additionally, detected when the processing circuit 202 receives an improperly formatted write transaction for the instruction memory 204. Errors can also, alternatively or additionally, be detected when the queue 110 becomes full, or no queue has been configured or enabled for writing a notification message, among other examples.

The condition detection circuit 216 may also be configured to detect a non-error condition generated in the offload engine 108 during runtime. In some instances, the non-error condition may indicate an internal state of the offload engine 108, which may provide information related to an internal status of the offload engine 108. For example, a certain operation that occurred in the offload engine 108 may be monitored by the host processor 102 to debug, or to improve performance by reconfiguring the offload engine 108. As an example, a correctable ECC error may indicate a non-error condition and the host processor 102 may use this information to monitor the health of the instruction memory 204. By keeping track of the ECC errors detected in the offload engine 108 over a period of time, the host processor 102 may determine that a portion or all of the instruction memory 204 may be starting to fail so that appropriate action may be taken.

In some instances, a condition may be detected but no action may be needed upon detection of the condition. For example, a certain condition may indicate that the queue 110 is full which may result in causing a halt to the offload engine 108 but it may not require immediate attention by the host processor 102. In some instances, the host processor 102 may want to ignore certain conditions. In such cases, those conditions may be masked so that the detected condition is not reported to the host processor 102. For example, in certain instances, a forward branch error or a backward branch error may be masked for debugging purposes. The conditions may be masked by gating the condition with a respective masking bit, or by disabling the generation of the notification message, the halt signal or the interrupt signal.

The condition reporting management 214 may be configured to generate, based on a configuration, one or more of a notification message, a halt enable, or an interrupt enable upon detection of the condition 218 by the condition detection circuit 216. For example, the condition reporting management 214 may generate the notification message based on a notification enable being set, the halt signal based on a halt enable being set, or the interrupt signal based on an interrupt enable being set in a reporting configuration register. Being set may correspond to setting the respective enable as high, low, one, zero, or an expected value based on the implementation. In some instances, the condition reporting management 214 may ignore or mask the condition based on the generation of the notification message, the halt signal, and the interrupt signal being disabled for the condition 218.

In different implementations, the condition reporting management 214 may generate different reporting options for different error types based on different configuration values. For example, a first configuration may represent a first error type, a second configuration may represent a second error type, a third configuration may represent a third error type, a fourth configuration may represent a fourth error type, and so on. In various examples, each error type may correspond to a group of errors. For example, the first error type may correspond to a first group of errors, the second error type may correspond to a second group of errors, the third error type may correspond to a third group of errors, and the fourth error type may correspond to a fourth group of errors. As an example, the first group of errors may be associated with runtime performance errors, e.g., notification queue full error condition, buffer overflow error condition, etc. The second group of errors may be associated with hardware errors, e.g., correctable ECC error condition, non-correctable ECC error condition, etc. The third group of errors may be associated with programming errors, e.g., unknown instruction error condition, forward branch error condition, backward branch error condition, misaligned write address error condition, notification queue disabled error condition, illegal instruction error condition, etc. The fourth group of errors may be associated with system errors, e.g., wait instruction timeout error condition, interconnect write error response error condition, etc.

In some embodiments, the condition reporting management 214 may further include a physical queue for storing outgoing notification messages. A hardware queue can enable the condition reporting management 214 to store the notification messages that are generated concurrently (e.g., in the same clock cycle), for example. The hardware queue can also enable the condition reporting management 214 to store the notification messages when the output interface 212 is busy being used to output other data. In these and other examples, additional conditions that the condition reporting management 214 can detect may include the hardware queue being full when the condition reporting management 214 has more notification messages to generate. The condition reporting management 214 is further explained with reference to FIG. 3.

Figure 3:
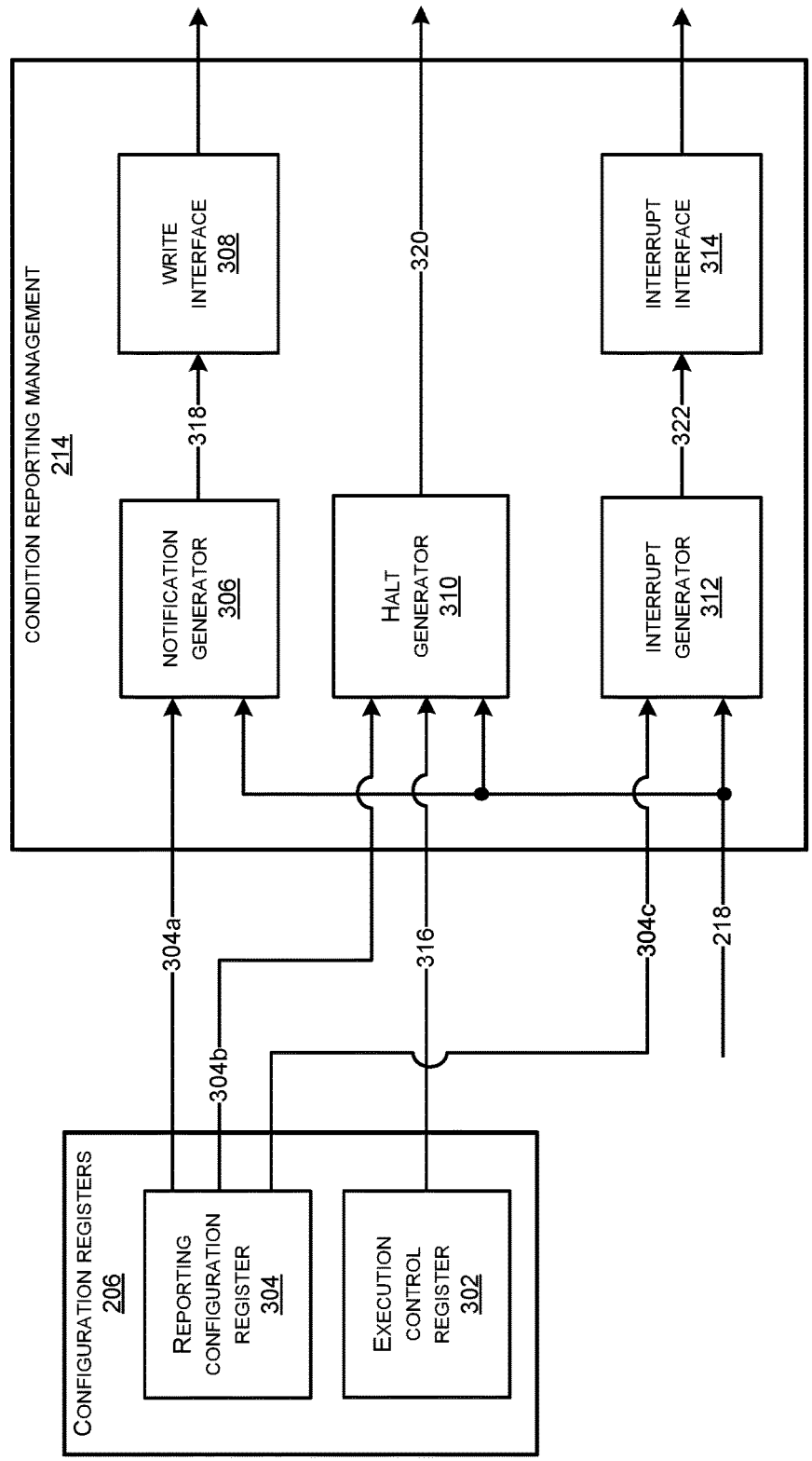
FIG. 3 illustrates an apparatus showing high level details of the offload engine according to one embodiment.

FIG. 3 illustrates an apparatus 300 showing high level details of the offload engine 108 according to one embodiment. The apparatus 300 shows the configuration registers 206 providing various configuration values to the condition reporting management 214 for generation of the notification message, the halt signal, and the interrupt signal. The condition reporting management 214 may include a notification generator 306, a write interface 308, a halt generator 310, an interrupt generator 312, and an interrupt interface 314.

The configuration registers 206 may include an execution control register 302 and a reporting configuration register 304. The execution control register 302 may be used for setting or clearing the halt signal. The reporting configuration register 304 may be configured to individually enable or disable the generation of a notification message, a halt signal, or an interrupt signal for each detected condition. The configuration registers 206 may be programmed by the driver 106 executing on the host processor 102. Note that the configuration registers 206 may also include a set of registers, among other registers, to manage the queue 110 (e.g., the base address, head pointer, tail pointer, etc.), which are not shown in FIG. 3, for the simplicity of illustration. The execution control register 302 and the reporting configuration register 304 are further discussed with reference to FIGS. 4A and 4B.

Figure 4A:
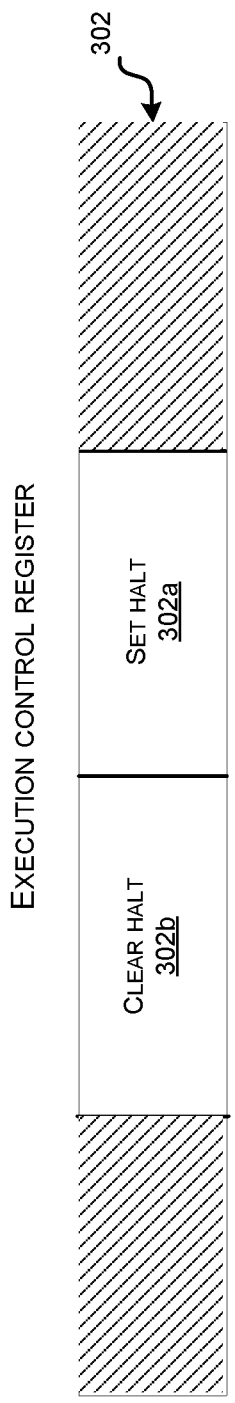
FIG. 4A illustrates an example execution control register according to one embodiment.

FIG. 4A illustrates an example execution control register 302 according to one embodiment.

The Execution control register 302 may include a set halt bit 302a, a clear halt bit 302b, among other reserved bits. In some examples, upon detection of an error or a non-error condition, the set halt bit 302a may be set to "1", "0" or another pre-determined value to generate a halt signal to stop the offload engine 108 from executing the instructions. In the halted state, accesses to the configuration registers 206 may be allowed. The clear halt bit 302b may be set to "1", "0" or another pre-determined value to de-assert the halt signal to resume the offload engine 108 from the halted state. In some implementations, instead of separate set halt bit 302a and the clear halt bit 302b, a single bit may be used to assert and de-assert the halt signal. The condition reporting management 214 may report the detected condition to the host processor 102 based on the configuration of the reporting configuration register 304. An example reporting configuration register is shown in FIG. 4B.

Figure 4B:
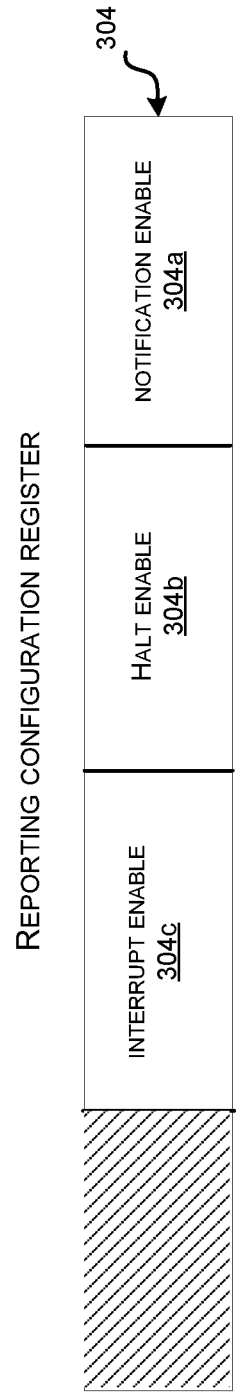
FIG. 4B illustrates an example reporting configuration register according to one embodiment.

FIG. 4B illustrates an example reporting configuration register 304 according to one embodiment.

The reporting configuration register 304 may include a notification enable 304a, a halt enable 304b, and an interrupt enable 304c. The reporting configuration register 304 may be configured to enable the generation of the notification message, the halt signal, the interrupt signal, or a combination thereof for a condition. In one embodiment, a respective reporting configuration register may exist corresponding to each condition, which can be programmed to enable appropriate reporting options for the respective condition. For example, in some instances, the notification enable 304a may be set to enable the generation of a corresponding notification message, the interrupt enable 304c may be set to enable the generation of an interrupt signal and the halt enable 304b may be set to enable the generation of a halt signal for an error condition. In some implementations, a condition can be masked by disabling the generation of the notification message, halt signal and the interrupt signal for the condition by programming the notification enable 304a, halt enable 304b, and the interrupt enable 304c in the reporting configuration register 304 to the appropriate values. In some implementations, setting the notification enable 304a for certain conditions may not be allowed. For example, for conditions such as the queue overflow condition or the queue disabled condition, there may not be a queue available for writing the notification message. Hence, generation of the notification message may be disabled in such cases, and the interrupt enable 304c or the halt enable 304b may be enabled to report the condition.

Each of the notification enable 304a, the halt enable 304b, and the interrupt enable 304c may be one bit each. Enabling or disabling the generation of the notification enable 304a, the halt enable 304b, or the interrupt enable 304c may correspond to setting the respective bit in the reporting configuration register 304 to one, zero, high, low, or an expected value based on the implementation. In another embodiment, each of the notification enable 304a, the halt enable 304b, and the interrupt enable 304c may include multiple bits corresponding to the pre-determined conditions supported by the computing system 100. Note that other implementations of enabling or disabling the generation of a combination of the notification message, the halt signal, and the interrupt signal are possible without deviating from the scope of the disclosed technologies.

In some embodiments, the reporting configuration register 304 may be programmed with different configuration values to represent different error types. For example, the reporting configuration register 304 may be programmed with a first configuration value, a second configuration value, a third configuration, etc., for different error types. It will be understood that nine different configurations may be used for nine different reporting options representing different combinations of the notification message, halt signal, and the interrupt signal. As an example, the first configuration value may correspond to enabling the generation of only a notification message, the second configuration value may correspond to enabling the generation of a notification message and an interrupt signal, the third configuration value may correspond to enabling the generation of a notification message, an interrupt signal and a halt signal, the fourth configuration value may correspond to enabling the generation of only a halt signal, the fifth configuration value may correspond to enabling the generation of a notification message and a halt signal, and so on.

Referring back to FIG. 3, the execution control register 302 may provide a halt control signal 316 to the condition reporting management 214 indicating whether the halt signal 320 is to be asserted or de-asserted. The reporting configuration register 304 may provide the notification enable 304a, the halt enable 304b and the interrupt enable 304c to the condition reporting management 214 indicating whether a notification message 318, a halt signal 320, or an interrupt signal 322 is to be generated based on the respective values of the notification enable 304a, the halt enable 304b, and the interrupt enable 304c for different configurations.

The notification generator 306 may be configured to generate a notification message based on the notification enable 304a for the condition 218. In some implementations, a respective reporting configuration register 304 may exist in the configuration registers 206 for each condition, which can provide respective values for the notification enable 304a, the halt enable 304b, and the interrupt enable 304c to the condition reporting management 214. The notification generator 306 may generate the notification for the condition 218 if the corresponding notification enable 304a is set. According to some embodiments, notification messages for certain conditions can be suppressed in situations where the condition is expected to occur or occurrence of the condition is not considered significant. The notification message 318 may be sent to the host processor 102 via the write interface 308. An example illustration of the notification message 318 is described with reference to FIG. 5.

Figure 5:
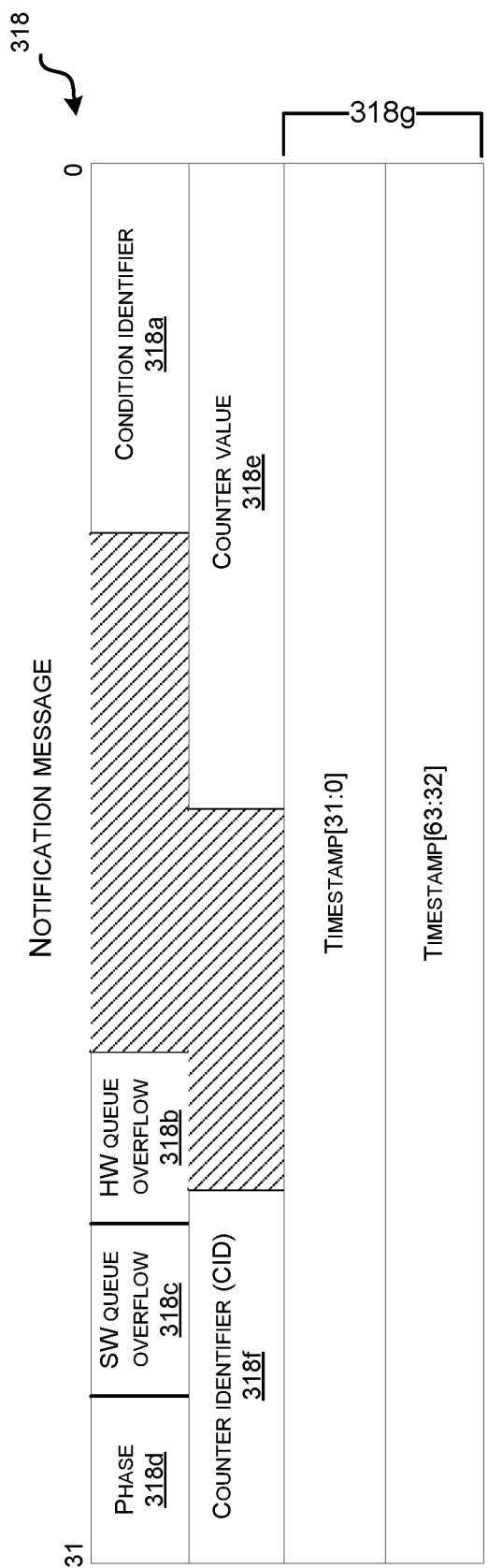
FIG. 5 illustrates an example format for a notification message according to one embodiment.

FIG. 5 illustrates an example format for the notification message 318 according to one embodiment. The diagram is being provided to illustrate one example format for notification messages, with the understanding that other formats, which can provide similar or different information, are possible. In various examples, an integrated circuit comprising a processor, such as the offload engine 108 illustrated in FIGS. 1 and 2, can use the example format 318 to compose a notification message, and a software program, such as the driver 106 illustrated in FIG. 1, can expect notification messages to be formatted according to the example of FIG. 5. As discussed further below, the example format 318 can be used to define more specific notification message formats. In the example of FIG. 5, the notification message 318 is 32 bits wide and may include a total of 128 bits. In other examples, the format can include more or fewer total bits. The notification message 318 may comprise a condition identifier 318a, a hardware (HW) queue overflow bit 318b, a software (SW) queue overflow bit 318c, a phase bit 318d, a counter value 318e, a counter identifier (CID) 318f, and a timestamp 318g. The notification message 318 may also include some reserved fields.

The condition identifier 318a may indicate a type of the condition detected in the offload engine 108. For example, in some instances, the condition identifier 318a may indicate an error condition and the notification message 318 may be used by the host processor 102 to resolve the error condition. In other instances, the condition identifier 318a may indicate a non-error condition corresponding to an internal status of the offload engine 108, which can be monitored by the host processor 102 using the notification message 318. The error condition or the non-error condition may correspond to a group of errors associated with a specific error type. As an example, a first value for the condition identifier 318a may indicate an unknown instruction condition, a second value may indicate an illegal value in instruction field condition, a third value may indicate a misaligned write address condition, a fourth value may indicate a correctable ECC condition, a fifth value may indicate a non-correctable ECC condition, a sixth value may indicate a forward branch condition, a seventh value may indicate a backwards branch condition, an eighth value may indicate a queue overflow condition, a ninth value may indicate a queue disabled condition, a tenth value may indicate a wait instruction timeout condition, and so on. In some examples, the queue overflow condition may correspond to a first group of errors associated with a first error type. The correctable ECC condition and the non-correctable ECC condition may correspond to a second group of errors associated with a second error type. The unknown instruction condition, illegal value in instruction field condition, misaligned write address condition, queue disabled condition, forward branch condition, and the backwards branch condition may correspond to a third group of errors associated with a third error type. The wait instruction timeout condition may correspond to a fourth group of errors associated with a fourth error type.

In some examples, the error conditions may include the unknown instruction condition, illegal value in instruction field condition, and the misaligned write address condition, which may need to be resolved by the host processor 102. The non-error conditions may include correctable ECC condition, non-correctable ECC condition, forward branch condition, backwards branch condition, queue overflow condition, queue disabled condition, and the wait instruction timeout condition, which may correspond to an internal status of the offload engine 108 at the respective point in time. The offload engine 108 may use the reporting of non-error conditions for debugging, or for monitoring health or performance of the offload engine 108.

In the illustrated example, the phase bit 318d, the HW queue overflow bit 318b, and the SW queue overflow bit 318c may be single-bit indicators. As discussed above, the phase bit 318d may be used by software to see whether the queue 110 has a new notification message. For example, software such as the driver 106 can periodically check a queue entry indicated by a head pointer to see if the phase bit in the entry is set to the current phase value. In this example, when the software finds the previous phase value, the software knows that the entry is storing an old notification message, and when the software finds the current phase value, the software knows the entry is storing a new notification message. The HW queue overflow bit 318b can indicate that a hardware queue is full and additional notification messages could not be added to the queue. The hardware queue can be, for example, a queue in the offload engine 108, which the offload engine 108 may use to store notification messages until the notification messages can be sent from the offload engine 108. The HW queue overflow bit 318b can be set, for example, in the last notification message that the hardware queue can accept before becoming full.

The SW queue overflow bit 318c may be set to indicate that the queue 110 in the memory 104 has become full, and that some notification messages for the queue 110 are being dropped. The SW queue overflow bit 318c can be set, for example, in the last notification message that the queue 110 can accept before becoming full. In some cases, a queue may become full, and the offload engine 108 may have more notification messages to add to the queue 110. The queue 110 may have become full, for example, because the offload engine 108 is generating notification messages for the queue 110 at a faster rate than the driver 106 is reading the notification messages out, or because the queue 110 is too small for the number of notification messages that the offload engine 108 is generating, or because the offload engine 108 is experiencing a problem and is generating too many notification messages, or for another reason. In some examples, it may be desirable to allow the queue 110 to fill and let notification messages be lost, and to otherwise not interfere with the operation of the offload engine 108 when a queue overflow occurs.

The CID 318f may be used to identify one of multiple counters that can be maintained by the offload engine 108, and the counter value 318e can include a value of the counter at the time the notification message is generated. For example, the counter may be one of the counters in the counters 218. As an example, the CID 318f can be four bits in order to identify up to sixteen counters. In some implementations, a configuration register can designate a counter that is to be used for notification messages for all the pre-determined conditions. Alternatively or additionally, the notification messages may always use a particular counter, can use the last counter that was incremented or decremented, or another technique can be used to specify the counter.

In various examples, program code can manipulate a counter to associate the counter with a specific condition. For example, when a certain condition occurs repeatedly, instructions can increment or decrement the counter to count each occurrence. As another example, a counter that is not associated with a condition can be captured. For example, the program code may be using a counter to count iterations of a loop or repeated execution of a particular set of operations. In this example, capturing a counter value in notification messages for error conditions can assist in debugging a problem with this code or a problem that happens to occur during the execution of this code.

The timestamp 318g can include a value obtained from the timestamp counter in the counters 218. In various examples, all notification messages may receive a timestamp from the same timestamp counter. In some implementations, the timestamp included in the notification message may be adjusted by few cycles to compensate for the time elapsed between detection of the condition and the generation of the notification message. Additionally, notification messages that are triggered in the same clock cycle can receive the same timestamp. The timestamp can thus be used to relate one notification message to another. In some instances, the current timestamp register may be read to determine a current value of the timestamp relative to the timestamps included in the notification messages.

Referring back to FIG. 3, in these and other examples, the notification generator 306 can generate the notification message 318 that can identify a condition. Unlike an interrupt mechanism, the notification message 318 can provide all the information for the condition, such that additional information about the condition does not need to be read from the offload engine 108. Additionally, the notification message 318 does not need the immediate attention of the computing system's primary processor, unlike an interrupt, and can be handled whenever the processor has time to read the queue 110.

In various examples, when the notification generator 306 determines that the queue 110 will be full upon receiving another notification message, the notification generator 306 can set the SW queue overflow bit 318c in the notification message 318 to indicate that additional notification messages for the queue 110 may have been lost. In these examples, notification messages may not be considered catastrophic, and the offload engine 108 may be allowed to continue executing instructions. The notification generator 306 may stop generating notification messages for the queue 110 that is full so long as the queue 110 continues to be full. For example, the notification enable 304a for the condition (e.g., queue overflow) may be reset to disable the generation of the notification message 318. Once the notification generator 306 receives an indication that the queue 110 has space for more notification messages (e.g., by way of an update to the head pointer for the queue 110), the notification generator 306 can continue generating notification messages for the queue 110.

In addition to generating notification messages, the notification generator 306 can perform other management operations for the notification messages. For example, the notification generator 306 can include a current timestamp value from the timestamp counter to be included in each notification message. In this and other examples, by obtaining a timestamp value from the same timestamp counter, the notification messages can be correlated to one another based on the timestamps. Additionally, for example, when multiple conditions occur concurrently (e.g., in the same clock cycle), or the notification generator 306 otherwise receives simultaneous requests to generate notification messages, the notification generator 306 can apply the same timestamp to each notification message generated. That is, the notification generator 306 need not queue simultaneous notification requests, and can instead handle each request at the same time (e.g., within the same clock cycle). By applying the same timestamp to concurrently occurring notification messages, the notification messages can indicate different conditions that occurred in the offload engine 108 at the same time. This may be helpful to the host processor 102 to analyze the performance of the offload engine 108 or for debugging.

In various examples, when a computing system includes more than one offload engine, timestamp counters in the multiple offload engines can be synchronized, for example by being started on the same value (e.g., at zero) at the same time. For example, the offload engines can be made to exit reset in the same clock cycle, or may wait for an explicit signal before starting the timestamp counters. In some examples, the offload engines may further periodically be synchronized, for example by receiving an updated value for the timestamp, from which each offload engine can subsequently start counting.

The write interface 308 may be configured to provide the notification message 318 for writing in the memory accessible by the host processor 102. For example, the write interface 308 may provide the interface for writing the notification message 318 in the queue 110. In some embodiments, the write interface 308 may include a hardware queue to store notification messages until the notification messages can be sent from the offload engine 108 via the output interface 212.

The write interface 308 can further keep track of the queue 110 in the memory 104 (and/or another external memory). For example, the configuration registers 206 can include registers that may store information such as a base address and size for the queue 110, as well as the current head pointer location and tail pointer location for the queue 110. In this example, the write interface 308 can update the tail pointer of the queue 110 upon sending the notification message 318 to the queue 110. The write interface 308 can, for example, cause a transaction to be sent, either through the output interface 212 or the combined input/output interface 208, which indicates the update to the tail pointer. As another example, the write interface 308 can check whether the queue 110 is full by examining the head and tail pointers of the queue 110.

In various examples, the offload engine 108 can operate the queue 110 as a first-in, first-out (FIFO) buffer. For example, the write interface 308 can maintain a head pointer and a tail pointer for the queue 110, with the tail pointer indicating an address in the memory 104 at which the write interface 308 can write new notification messages, and the head pointer indicating the next notification message to read from the queue 110. In some examples, the write interface 308 can use an absolute address for the head pointer and/or the tail pointer, where the absolute address is an address in the address space of the memory 104. In some examples, the write interface 308 can use an index for the head pointer and/or the tail pointer, where the indices indicate an offset from a base address for a queue. When the address space of the memory 104 is large (e.g., addresses use 32 or 64 bits) and the queue 110 is small (e.g., fewer than one million entries), using offsets from the base address can require fewer bits to represent the pointers.

In some examples, the offload engine 108 and the driver 106 can independently maintain the head pointer and tail pointer for the queue 110. The offload engine 108, for example, can include registers that store the pointer values, and the driver 106 can use memory locations in the memory 104 to store the pointer values. In this example, the offload engine 108 can notify the driver 106 whenever the offload engine 108 adds a notification message to the queue 110, so that the driver 106 can update the driver's version of the tail pointer. For example, the write transaction for writing the notification message 318 to the memory 104 can be received at the driver 106, and can serve to inform the driver 106 to update the driver's copy of the tail pointer. Alternatively or additionally, the offload engine 108 can follow writing of a notification message 318 with a write to the memory address that stores the tail pointer for the driver 106, to indicate a new tail pointer value. Alternatively or additionally, the driver 106 can periodically read the tail pointer from the offload engine 108 to determine whether the tail pointer has changed.

As a further example, whenever the driver 106 reads a notification message from the queue 110, the driver 106 can inform the offload engine 108 to update a head pointer for the queue 110. For example, the driver 106 can write to the offload engine 108 to indicate a head pointer update. In some examples, the driver 106 can send a value to the offload engine 108, where the value indicates a number of indices by which the offload engine 108 should move the head pointer.

An alternative or additional method for informing the driver 106 that the offload engine 108 has added a notification message to the queue 110 is to use the phase 318*d* in the notification message to so indicate. In this example, the offload engine 108 can change the value of the phase 318*d* whenever the entries in the queue 110 wrap from the end of the queue back to the beginning. For example, the driver 106 can initially, before any notification messages are received, write all zeros to each entry in the queue 110. In this example, when the offload engine 108 starts to send notification messages, the offload engine 108 can set the phase 318*d* in each notification message to one. The driver 106 can then periodically check the queue entry pointed to by the head pointer to see if the phase 318*d* has been changed from zero to one, and when the phase 318*d* has changed to one the driver 106 may know that the entry at the head pointer is now a new notification message. Also in this example, when the tail pointer wraps around to the first entry in the queue 110 (due to the tail pointer having reached the end of the memory space allocated for the queue 110 and being set to the base address of the queue 110), the offload engine 108 can start using a value of zero for the phase 318*d*. When the head pointer also wraps to the first entry in the queue 100, the driver 106 can then start checking for a phase 318*d* of zero instead of one to determine whether the offload engine 108 has added a new entry to the queue 110. In this example, the driver 106 need not read the tail pointer from the offload engine 108 to determine whether the offload engine 108 has added a notification message to the queue 110.

The halt generator 310 may be configured to generate the halt signal 320 based on the halt enable 304*b* and the halt control signal 316 for a given condition. As discussed with reference to FIG. 4A, in some implementations, the halt signal 320 may be generated by setting the set halt bit 302*a* in the execution control register 302. The halt signal 320 may be an active high signal, an active low signal, a pulse, or any suitable implementation. The halt signal 320 may be used to stop the processing circuit 202 from executing the instructions. As an example, the halt signal 320 may be generated to stall the processing circuit 202 from executing the instructions when there is no room in a queue to store additional notification messages. In some examples, it may not be desirable to let the offload engine 108 continue executing instructions when the queue 110 is full. In these examples, when the offload engine 108 determines that there is no room in the queue 110 for an additional notification message, the offload engine 108 can be halted until the driver 106 informs the offload engine 108 that there is room (e.g., by advancing the head pointer for the queue 110). Halting, in this context, means that the offload engine 108 may stop executing instructions until the halt condition is resolved. The halt signal 320 may be de-asserted or de-activated once the condition is resolved (e.g., the queue is able to store new notification messages) so that the offload engine 108 can resume its normal operation. As discussed with reference to FIG. 4A, in some implementations, the halt signal 320 may be de-asserted by setting the clear halt bit 302*b* in the execution control register 302.

The interrupt generator 312 may be configured to generate the interrupt signal 322 based on the interrupt enable 304*c* for a given condition. The interrupt signal 322 may be an active high signal, an active low signal, a single clock pulse, or any suitable implementation. In some implementations, the interrupt generator 312 may generate the interrupt signal 322 based on the synchronization or edge detection requirements by the interrupt controller of the host processor 102. The interrupt signal 322 may be sent to the host processor 102 for processing via the interrupt interface 314. In many cases, the interrupt signal 322 by itself can provide information about internal state of the offload engine 108, and/or the driver 106 may read a register that stores information that may describe what caused the offload engine 108 to generate the interrupt signal 322. For example, in some instances, the notification message 318 may be generated along with the interrupt signal 322 and the driver 106 can read the condition identifier 318*a* in the notification message 318 to identify the condition that caused the interrupt. In some embodiments, the interrupt signal 322 may be generated with the halt signal 320 to notify the host processor 102 of the condition and/or that the offload engine 108 is halted. The host processor 102 may resolve the condition upon receiving the interrupt signal 322 and the halt signal 320 may be de-asserted or de-activated so that the offload engine 108 can resume its normal operation. The interrupt signal 322 may be sent to the host processor 102 via the interrupt interface 314.

The interrupt interface 314 may be configured to provide the interrupt signal 322 to the host processor 102. For example, the interrupt interface 314 may include a port or another suitable interface to communicate with the host processor 102.

Figure 6:
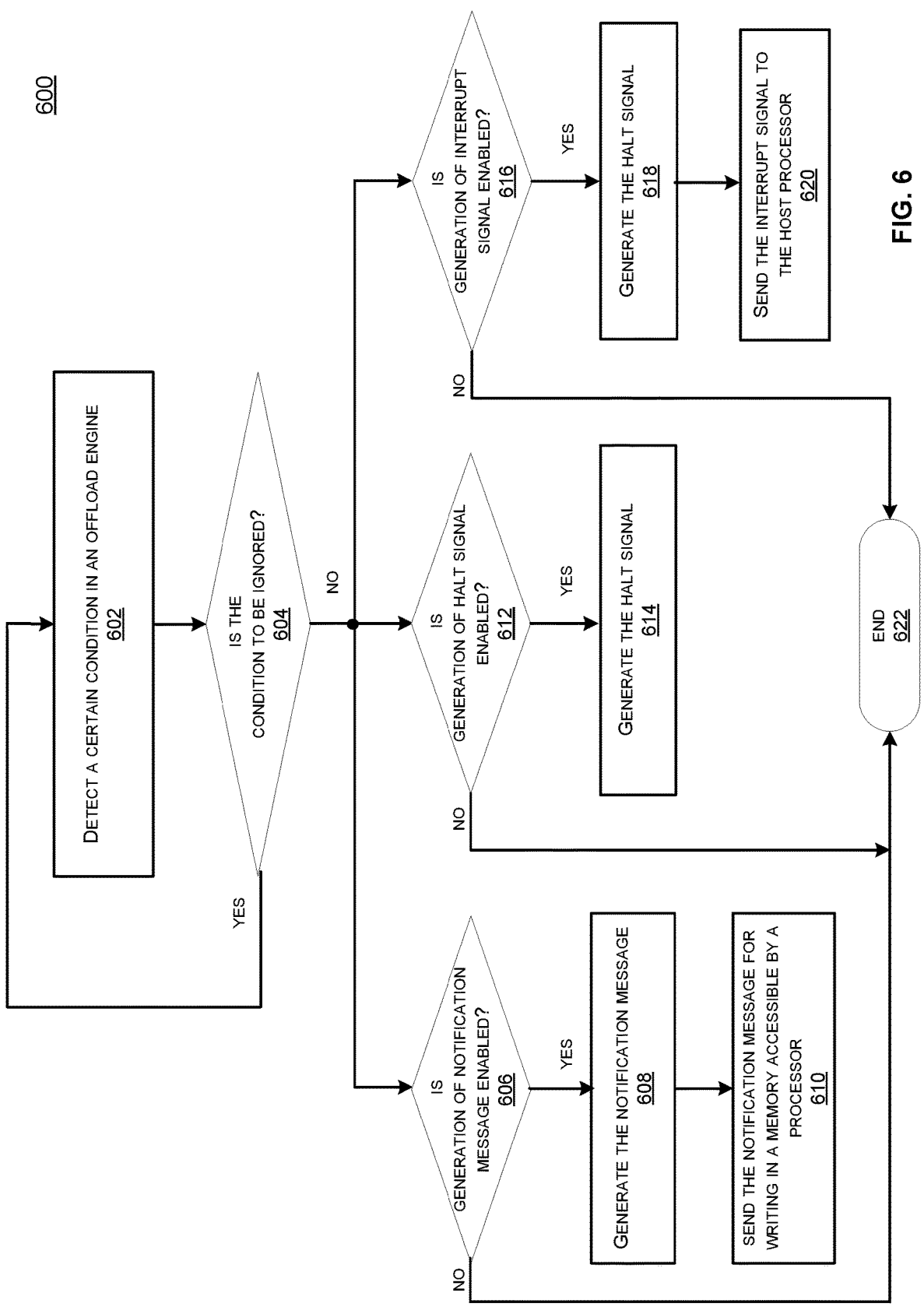
FIG. 6 illustrates a method executed by an integrated circuit for configurable reporting of a condition detected in the integrated circuit in one embodiment.

FIG. 6 illustrates a method executed by an integrated circuit for configurable reporting of a condition detected in the integrated circuit, according to an embodiment. The integrated circuit may be capable of executing instructions stored in a program memory. As an example, the integrated circuit may be the offload engine 108 as discussed with reference to FIGS. 1 and 2.

In a step 602, the integrated circuit may detect a certain condition generated within the integrated circuit. Referring back to FIG. 2, the offload engine 108 may encounter a specific condition during runtime. The condition detection circuit 216 may detect the condition 218. The condition 218 may be an error condition or a non-error condition. For example, the error condition may have occurred due to a problem in the operation of the hardware of the offload engine 108, due to misconfiguration of the offload engine 108, because of problems in the program code, and/or due to the offload engine 108 receiving problematic instructions from other components in the computing system. The non-error condition may be a predetermined condition which may provide information related to an internal status of the offload engine 108. The condition 218 may correspond to a group of errors based on the error type. As an example, the first group of errors may be associated with runtime performance errors, the second group of errors may be associated with hardware errors, the third group of errors may be associated with programming errors, the fourth group of errors may be associated with system errors, and so on. The condition 218 may be detected by the condition detection circuit 216 irrespective of the type of the condition.

In a step 604, the integrated circuit may determine whether the condition 218 is to be ignored. As discussed with reference to FIG. 3 and FIG. 4, if none of the notification enable 304*a*, halt enable 304*b*, and the interrupt enable 304*c* are asserted in the reporting configuration register 304 for the condition, the integrated circuit may determine that the condition is to be ignored. In this case, no reporting of the condition 218 may be performed and the offload engine 108 may continue to detect new conditions in the step 602. However, if generation of one or more of a notification message, a halt signal, or an interrupt signal is enabled based on the reporting configuration as indicated by the reporting configuration register 304 for the condition 218, the integrated circuit may report the condition accordingly.

In a step 606, the integrated circuit may determine whether generation of a notification message is enabled for the condition. As discussed with reference to FIG. 3, the notification generator 306 may determine whether generation of the notification message 318 is enabled for the condition 218. The notification generator 306 may determine that the generation of the notification message 318 is enabled for the condition 218 based on the notification enable 304a provided by the reporting configuration register 304. For example, the generation of the notification message 318 may be enabled for the condition 218 if the notification enable 304a is asserted (e.g., set to one). In various examples, the notification enable 304a may be gated with an error masking bit or may represent an error masking bit. For example, a value of "1" for the notification enable 304a may indicate that the condition is not masked and the generation of the notification message 318 is enabled.

In a step 608, the integrated circuit may generate the notification message if the generation of the notification message is enabled for the condition. As discussed with reference to FIG. 3, the notification generator 306 may generate the notification message 318 for the condition if the generation of the notification message is enabled as determined in the step 606. Referring back to FIG. 5, the notification message 318 may include the condition identifier 318a to identify the type of the condition 218. For example, the condition identifier 318a may indicate an unknown instruction condition, a misaligned write address condition, an ECC error condition, a branching error condition, a queue overflow condition, etc. In some instances, the HW queue overflow bit 318b or the SW queue overflow bit 318c in the notification message 318 may be set to indicate that the respective queue is now full. The notification message 318 may also include CID 318f to identify a counter associated with the condition 218, and the corresponding counter value 318e. The notification message 318 may also include the timestamp 318g to indicate a point in time the condition 218 occurred. The timestamp 318g may correspond to an adjusted value of the timestamp counter in the counters 218. For example, the adjusted value of the timestamp counter may include a compensation of the time delay between detection of the condition and the generation of the notification message 318. The phase bit 318d may be set to indicate to the driver 106 that a new notification message is in the queue 110.

In a step 610, the integrated circuit may send the notification message for writing in a memory accessible by the host processor. The offload engine 108 may send the notification message 318 for writing in the queue 110 in the memory 104 via the write interface 308. In some instances, the notification message 318 may be stored in a hardware queue in the offload engine 108 until the notification messages 318 can be sent from the offload engine 108 via the output interface 212. The driver 106 executing on the host processor 102 may determine that a new notification messages is in the queue 110 based on the phase bit 318d in the notification message 318. The host processor 102 can address the notification message 318 or ignore it based on the condition identifier 318a. For example, the host processor 102 may resolve an error condition and reconfigure the offload engine 108 if necessary. However, for a non-error condition, the host processor 102 may use the notification message to monitor the health or performance of the offload engine 108 and/or reconfigure the offload engine 108 if necessary.

In a step 612, the integrated circuit may determine whether generation of a halt signal is enabled for the condition. As discussed with reference to FIG. 3, the halt generator 310 may determine whether generation of the halt signal 320 is enabled for the condition 218. The halt generator 310 may determine that the generation of the halt signal 320 is enabled for the condition 218 based on the halt enable 304b provided by the reporting configuration register 304. For example, generation of the halt signal 320 may be enabled for the condition 218 if the halt enable 304b is asserted. In various examples, the halt enable 304b may be gated with an error masking bit or may represent an error masking bit. For example, a value of "1" for the halt enable 304b may indicate that the condition is not masked and the generation of the halt enable 304b is enabled.

In a step 614, the integrated circuit may generate the halt signal if the generation of the halt signal is enabled for the condition. As discussed with reference to FIG. 3, the halt generator 310 may generate the halt signal 320 for the condition if the generation of the halt signal is enabled. In some implementations, writing to the set halt bit 302a in the execution control register 302 may generate the halt signal 320. The halt signal 320 may be used to stop the offload engine 108 from executing the instructions. However, in the halted state, the configuration registers 206 may still be accessed and events can still be written. The halt signal 320 may be de-asserted once the condition has been resolved and the offload engine 108 can resume execution of the instructions. For example, in some implementations, writing to the clear halt bit 302b in the execution control register 302 may resume the integrated circuit to the normal operation.

In a step 616, the integrated circuit may determine whether generation of an interrupt signal is enabled for the condition. As discussed with reference to FIG. 3, the interrupt generator 312 may determine whether generation of the interrupt signal 322 is enabled for the condition 218. The interrupt generator 312 may determine that the generation of the interrupt signal 322 is enabled for the condition 218 based on the interrupt enable 304c provided by the reporting configuration register 304. For example, generation of the interrupt signal 322 may be enabled for the condition 218 if the interrupt enable 304c is asserted. In various examples, the interrupt enable 304c may be gated with an error masking bit or may represent an error masking bit. For example, a value of "1" for the interrupt enable 304c may indicate that the condition is not masked and the generation of the interrupt signal 316 is enabled.

In a step 618, the integrated circuit may generate the interrupt signal if the generation of the interrupt signal is enabled for the condition. As discussed with reference to FIG. 3, the interrupt generator 312 may generate the interrupt signal 322 for the condition 218 if the generation of the interrupt signal 322 is enabled. The interrupt signal 322 may be an active high signal, an active low signal, a pulse, or any suitable implementation. The interrupt signal 322 may be sent to the host processor 102 for processing via the interrupt interface 314.

In a step 620, the integrated circuit may send the interrupt signal to the host processor. As discussed with reference to FIG. 3, the interrupt interface 314 may provide the interrupt signal 322 to the host processor 102 via a port or another suitable interface.

In certain embodiments, upon detection of a condition, based on a configuration, one or more of the notification message 318, halt signal 320, or the interrupt signal 322 may be generated by the offload engine 108. In various examples, the configuration may represent an error type corresponding to a group of errors. As shown in FIG. 6, any combination of the steps 606-610, steps 612-614, and the steps 616-620 may be executed in parallel by the offload engine 108 for different error types based on different configurations. Each error type may correspond to a respective group of errors. The driver 106 can configure the reporting configuration register 304 to ignore the condition, or enable the generation of any combination of the notification message 318, halt signal 320, or the interrupt signal 322 for the condition, thus providing flexibility to the host processor 102 to handle the condition. Additionally, the notification messages can allow recreating a timeline which may be beneficial in determining a cause of the condition so that the offload engine can be reconfigured to avoid the condition or provide better performance in the future.

Figure 7:
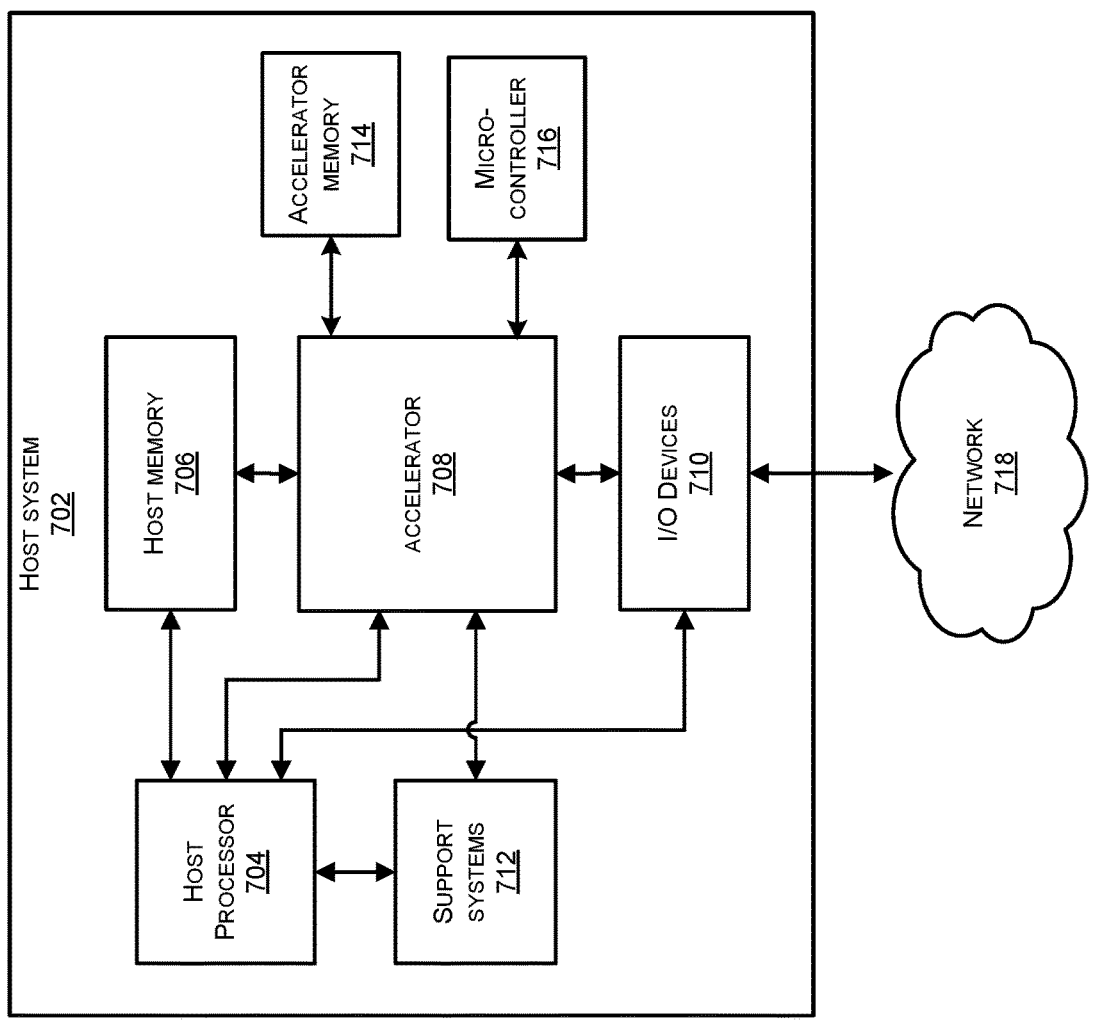
FIG. 7 includes an apparatus that illustrates an example of a host system in which one or more offload engines can be used.

FIG. 7 includes an apparatus 700 that illustrates an example of a host system 702 in which one or more offload engines can be used. The example host system 702 can include an accelerator 708, a host processor 704, a host memory 706, I/O devices 710, and support systems 712. The accelerator 708 may include some of the functionality of the offload engine 108 as discussed with reference to FIGS. 1 and 2. For example, the accelerator 708 may include configurable reporting capability of the offload engine 108. In some embodiments, the accelerator 708 may be coupled to a microcontroller 716 and an accelerator memory 714. In various implementations, the host system 702 can include other hardware that is not illustrated here.

The host processor 704 can be a general purpose integrated circuit that is capable of executing program instructions. The host processor 704 can also be referred to as a CPU. The host processor 704 may include functionality of the host processor 102 discussed with reference to FIG. 1. The host processor 704 may be responsible for the overall management and control of the host system 702, including executing an operating system for the host system 702. In some examples, the host processor 704 can include multiple processing cores. In some examples, the host system 702 can include more than one host processor. In some examples, the host processor 702 and the accelerator 708 can be one chip, such as, for example, one or more integrated circuits within the same package. In some examples, the host processor 704 may communicate with the accelerator 708 using a PCIe interface or other suitable interface.

The host memory 706 can include memory that is used by the host processor 704 for storage of program code that the host processor 704 is in the process of executing, as well as for storage of values that are being operated on by the host processor 704. The host memory 706 may be a DRAM, an SDRAM, an SRAM, or any volatile and/or non-volatile memory in various implementations. The host memory 706 may include the memory 104 discussed with reference to FIG. 1. In some examples, the accelerator memory 714 may include memory for the accelerator 708. The accelerator memory 714 may be an SRAM, or any volatile and/or non-volatile memory. In some other examples, the host memory 706 may also be accessible to the accelerator 708. For example, the host memory 706 may include separate memory or memory banks for the host processor 704 and for use by the accelerator 708.

The I/O devices 710 can include hardware for connecting to user input and output devices, such as keyboards, monitors, and printers, among other devices. The I/O devices 710 can also include storage drives and/or a network interface for connecting to a network 718.

In various implementations, the support systems 712 can include hardware for coordinating the operations of the accelerator 708. For example, the support systems 712 can include one or more data management processors, which can manage movement of data into and out of the accelerator 708. A data management processor is another example of an integrated circuit device that could include functionality of an offload engine. For example, the data management processor may be similar to the offload engine 108 as discussed with reference to FIGS. 1 and 2. In some examples, the data management processors and the accelerator 708 can be on one device, such as one integrated circuit on the same die and in the same package.

The software programs executing on the host processor 704 can receive or generate input for processing by the accelerator 708. The programs can include, for example, graphics intensive programs such as video games or computer-aided design programs, computationally intensive programs such as modeling programs, or artificial intelligence programs such as speech recognition or image recognition programs. In various examples, the host processor 702 can determine to offload operations on input received from such programs to the accelerator 708, which can perform the operations more quickly than the host processor 702.

To assist the host processor 704 in using the accelerator 708, the host processor 704 can be executing a device driver or driver program for the accelerator 708. Similar to any other hardware driver, the driver program for the accelerator 708 can provide an interface through which an operating system can send requests to the accelerator 708 and receive results. Upon receiving a request, which can include data and an operation to be performed on the data, the driver program can handle execution of the operation by the accelerator 708, leaving the operating system free to perform other operations.

In various examples, handling a request for the accelerator 708 can include programming and activating a data management processor, which may be a component in the support systems 712 or in the accelerator 708. Programming the data management processor can include, for example, triggering a DMA transaction to copy program code from the host memory 706 to the data management processor, and triggering the data management processor to execute the code. Once the data management processor begins executing code, the driver program need not take further action until the operation being performed by the accelerator 708 is finished.

In various examples, the code executed by the data management processor can configure the accelerator 708, including copying program code and input data into the accelerator 708 and triggering the accelerator 708 to begin execution of the code. The data management processor can wait on the accelerator 708 to finish performing the operation, and can then copy any result of the operation from the accelerator 708 into the host memory 706, for example, the data management processor can then inform the driver program that results are ready, which can then inform the operating system or the program for which the result was computed.

In certain implementations, each of the accelerator 708 and the data management processor of the support systems 712 may support their respective configurable reporting mechanisms as discussed with reference to FIGS. 1-3. For example, each of the accelerator 708 and the data management processor may be configured to generate their respective combinations of a notification message, halt signal, and an interrupt signal based on their respective configurations. In certain embodiments, each of the accelerator 708 and the data management processor of the support systems 712 may maintain their own queue for notification messages which may not be visible to one another. For example, a first queue for storing notification messages generated by the data management processor may be managed and configured by a driver executing on the host processor 704 (e.g., similar to the driver 106 in FIG. 1). The first queue may be maintained in the host memory 706. The driver executing on the host processor 704 may also be responsible for configuring a first reporting configuration register in the data management processor to allow configurable reporting of the conditions detected in the data management processor.

A second queue for storing the notification messages generated by the accelerator 708 may be managed and configured by the microcontroller 716. The microcontroller 716 may include a general purpose microcontroller configured to execute firmware to manage the accelerator 708. For example, the microcontroller 716 may configure the reporting mechanisms in the accelerator 708 according to certain embodiments. The second queue may be maintained in the accelerator memory 714. In some implementations, the accelerator memory 714 may be integrated with the accelerator chip 708. The microcontroller 716 may also be responsible for configuring a second reporting configuration register in the accelerator 708 to allow configurable reporting of the conditions detected in the accelerator 708. The driver executing on the host processor 704 may not have access to the second queue for the accelerator 708, and the microcontroller 716 may not have access to the first queue for the data management processor. Additionally, different reporting options may be implemented in the data management processor and the accelerator 708 for different error types. For example, for the same type of condition detected in the data management processor and the accelerator 708, a halt signal may be generated in the data management processor, but the halt signal may not be generated in the accelerator 708. In some implementations, the microcontroller 716 may have higher privileges than the driver executing on the host processor 704, for example, the driver executing on the host processor 704 may belong to a user space. Thus, certain embodiments can allow different reporting options for the conditions detected in different processors within the same system.

Figure 8:
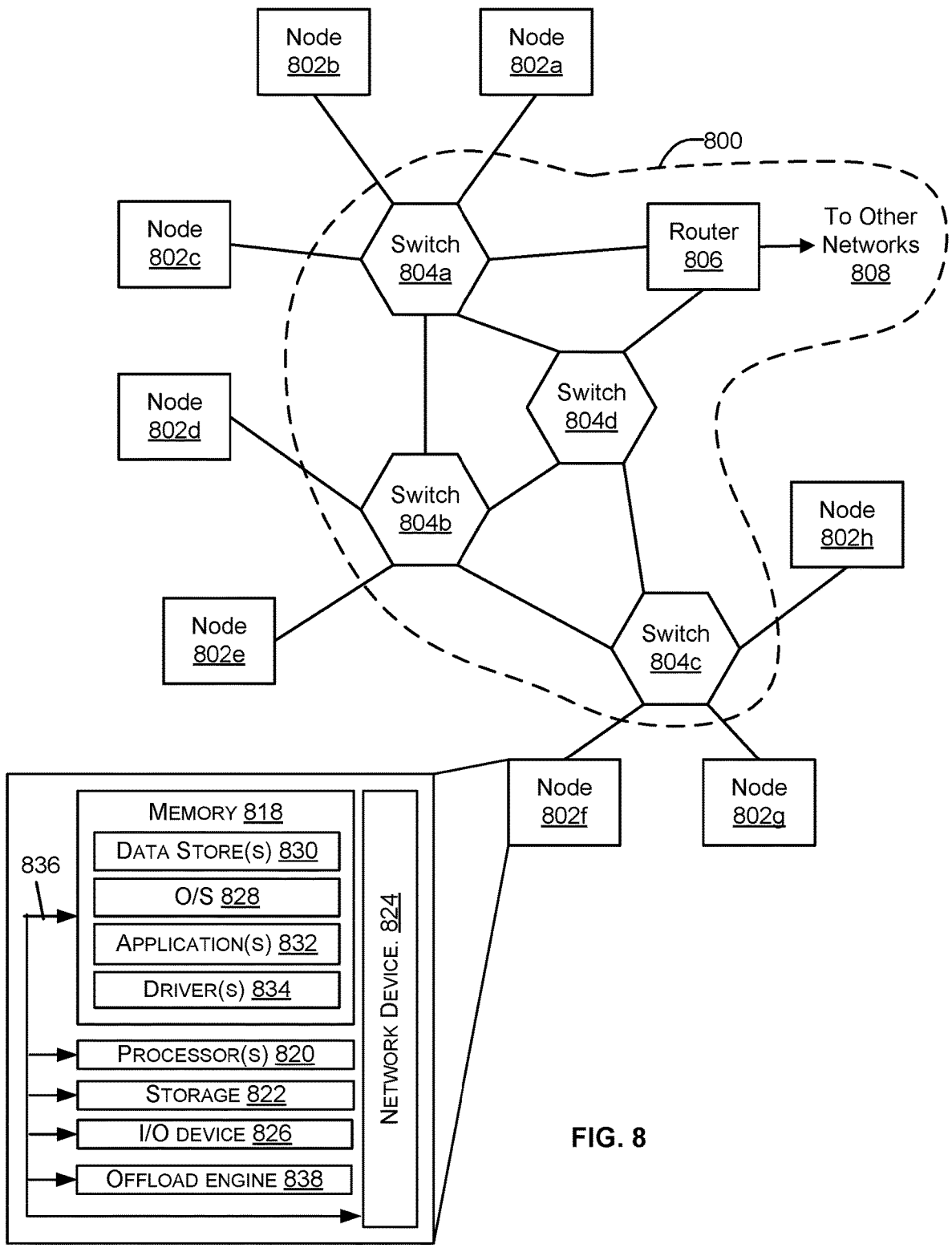
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, offload engine 838, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality. In some examples, the drivers 838 may include functionality of the driver 106 executing on the host processor 102 in FIG. 1. For example, the drivers 834 may configure the offload engine 838 to generate one or more reporting options for conditions detected in the offload engine 838.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM. In some examples, the memory 818 may implement a queue, similar to the queue 110, for storing notification messages generated by the offload engine 838.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also include an offload engine 838 which can offload certain operations from the processor(s) 820 so that the processor(s) 820 can be free to perform other operations. The offload engine 838 may be an accelerator or a type of processor, such as a floating point processor, a graphics processor, a neural network processor, a special-purpose processor, or any other type of integrated circuit device that can execute program code. The offload engine 838 may include functionality similar to the offload engine 108 discussed with reference to FIGS. 1 and 2.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An offload engine for a host processor in a computing system, the offload engine configured to:
   execute instructions stored in an instruction memory;
   detect an error in the offload engine;
   generate, based on detection of the error and a first configuration in a configuration register:
      a notification message, wherein the offload engine is further configured to write the notification message in a memory accessible by the host processor, and wherein the notification message includes a timestamp indicating a point in time the error occurred, and an error identifier for the error;
   generate, based on detection of the error and a second configuration in the configuration register:
      the notification message; and
      an interrupt signal to be sent to the host processor; and
   generate, based on detection of the error and a third configuration in the configuration register:
      the notification message;
      the interrupt signal; and
      a halt signal to stop the offload engine from executing the instructions.

2. The offload engine of claim 1, wherein the first configuration represents a first error type, the second configuration represents a second error type, and the third configuration represents a third error type.

3. The offload engine of claim 2, wherein the first error type corresponds to a first group of errors associated with runtime performance errors, the second error type corresponds to a second group of errors associated with hardware errors, and the third error type corresponds to a third group of errors associated with programming errors.

4. The offload engine of claim 1, wherein the offload engine is further configured to disable generation of the notification message, the interrupt signal, or the halt signal based on a fourth configuration in the configuration register.

5. An integrated circuit, comprising:
   a processing circuit configured to execute instructions;
   a condition detection circuit configured to detect an error condition in the integrated circuit;
   a notification generator configured to generate, upon detection of the error condition, a notification message to report the error condition to a processor coupled to the integrated circuit, wherein the notification message includes a timestamp indicating a point in time the error condition occurred, and a condition identifier for the error condition;
   a write interface configured to write the notification message in memory accessible by the processor; and
   a halt generator configured to generate a halt signal upon detection of the error condition,
   wherein the processing circuit is further configured to stop executing the instructions upon receiving the halt signal.

6. The integrated circuit of claim 5 further comprising:
   an interrupt generator configured to generate an interrupt signal upon detection of the error condition; and
   an interrupt interface configured to send the interrupt signal to the processor.

7. The integrated circuit of claim 6, wherein the condition identifier indicates a non-correctable error correction code (ECC) error corresponding to a first group of errors representing a first error type.

8. The integrated circuit of claim 6, wherein the condition identifier indicates an unknown instruction error corresponding to a second group of errors representing a second error type.

9. The integrated circuit of claim 6, wherein the interrupt generator is configured to generate the interrupt signal based on generation of the interrupt signal being enabled in a configuration register.

10. The integrated circuit of claim 5, wherein
   the condition detection circuit is further configured to detect a non-error condition in the integrated circuit, wherein the non-error condition is used to provide information associated with an internal status of the integrated circuit; and
   the notification generator is further configured to generate, upon detection of the non-error condition, the notification message to report the non-error condition to the processor, wherein the timestamp corresponds to the point in time the non-error condition occurred, and the condition identifier corresponds to the non-error condition, and wherein the notification message for the non-error condition is used to monitor health of the integrated circuit.

11. The integrated circuit of claim 10, wherein the notification generator is configured to generate the notification message based on generation of the notification message being enabled in a configuration register.

12. The integrated circuit of claim 5, wherein the halt generator is configured to generate the halt signal based on generation of the halt signal being enabled in a configuration register.

13. The integrated circuit of claim 5, wherein the processor uses timestamps from notification messages received over a period of time to build a timeline.

14. The integrated circuit of claim 5, wherein the integrated circuit is a neural network processor.

15. The integrated circuit of claim 5, wherein the integrated circuit is used to offload certain operations from the processor.

16. The integrated circuit of claim 5, the integrated circuit is a neural network processor.

17. A method implemented using an integrated circuit configured to execute instructions, the method comprising:
   detecting an error condition in the integrated circuit;
   determining, based on a configuration, that a halt signal is to be generated upon detection of the error condition;
   determining, based on the configuration, that a notification message is to be generated to report the error condition to a processor coupled to the integrated circuit and generating the notification message for the error condition, the notification message comprising a timestamp indicating a point in time the error condition occurred, and a condition identifier for the error condition;

writing the notification message to a memory accessible by the processor; and generating the halt signal to stop the integrated circuit from executing the instructions.

18. The method of claim 17 further comprising:

determining, based on the configuration, that an interrupt signal is to be generated;

generating the interrupt signal for the error condition; and sending the interrupt signal to a processor coupled to the integrated circuit.

19. The method of claim 17, further comprising:

detecting a non-error condition in the integrated circuit, wherein the non-error condition is used to provide information associated with an internal status of the integrated circuit;

determining, based on the configuration, that a notification message is to be generated to report the non-error condition to a processor coupled to the integrated circuit;

generating the notification message for the non-error condition, the notification message comprising a timestamp indicating a point in time the non-error condition occurred, and a condition identifier for the non-error condition; and writing the notification message to a memory accessible by the processor.

20. The method of claim 17, wherein the processor is configured to use timestamps from notification messages received over a period of time to build a timeline.

* * * * *